US010976601B2

(12) United States Patent
Kumamoto et al.

(10) Patent No.: US 10,976,601 B2
(45) Date of Patent: Apr. 13, 2021

(54) VIDEO DISPLAY DEVICE

(71) Applicant: Panasonic Intellectual Property Management Co., Ltd., Osaka (JP)

(72) Inventors: Yasuhiro Kumamoto, Osaka (JP); Takeichi Shinya, Osaka (JP); Koujirou Higa, Osaka (JP); Masaaki Ofuji, Osaka (JP); Taizou Takeuchi, Osaka (JP); Tadahiro Kugimaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/750,881

(22) PCT Filed: Aug. 30, 2016

(86) PCT No.: PCT/JP2016/003943
§ 371 (c)(1),
(2) Date: Feb. 7, 2018

(87) PCT Pub. No.: WO2017/038084
PCT Pub. Date: Mar. 9, 2017

(65) Prior Publication Data
US 2018/0196312 A1  Jul. 12, 2018

(30) Foreign Application Priority Data

Sep. 1, 2015 (JP) .............................. JP2015-172363
Mar. 10, 2016 (JP) .................................. 2016-047678

(51) Int. Cl.
*F21V 8/00* (2006.01)
*F21K 9/00* (2016.01)
(Continued)

(52) U.S. Cl.
CPC .......... *G02F 1/133605* (2013.01); *F21K 9/62* (2016.08); *G02F 1/133606* (2013.01); *G02F 1/133608* (2013.01); *G02F 1/133603* (2013.01)

(58) Field of Classification Search
CPC ................................................. G02F 1/133605
See application file for complete search history.

(56) References Cited

U.S. PATENT DOCUMENTS 6,362,801 B1   3/2002  Yuhara
7,471,354 B2 *  12/2008  Chen .................... G02B 6/0038
                                                                  349/113
(Continued)

FOREIGN PATENT DOCUMENTS

EP         2090924 A2    8/2009
EP         2184634 A2    5/2010
(Continued)

OTHER PUBLICATIONS

International Search Report of PCT application No. PCT/JP2016/003943 dated Nov. 8, 2016.
(Continued)

*Primary Examiner* — Sharon E Payne
(74) *Attorney, Agent, or Firm* — McDermott Will and Emery LLP

(57) ABSTRACT

A video display device includes: a display panel that displays an image based on an input image signal; a light source substrate that includes a plurality of light sources on a main surface which is a front side of the light source substrate, and emits, toward a rear side of the display panel, light emitted from the plurality of light sources; a reflection sheet that is provided on the main surface of the light source substrate, and in which hollow partitioning walls each of which separates adjacent two light sources of the plurality of light sources are formed; and an optical member that has a plate shape, is provided between the display panel and the light (Continued)

source substrate, and uniformizes luminance distribution of the light emitted from the light source substrate. The reflection sheet extends to an outside of an outer peripheral edge of the optical member as viewed from the front side.

17 Claims, 10 Drawing Sheets

(51) Int. Cl.
*G02F 1/13357* (2006.01)
*F21K 9/62* (2016.01)

(56) References Cited

U.S. PATENT DOCUMENTS

| | | | |
|---|---|---|---|
| 2003/0072153 | A1 | 4/2003 | Matsui et al. |
| 2004/0125269 | A1* | 7/2004 | Kim .................. G02F 1/133604 349/58 |
| 2004/0239829 | A1* | 12/2004 | Yu ..................... G02B 6/0051 349/61 |
| 2005/0200770 | A1* | 9/2005 | Kuo ................... G02B 6/0055 349/58 |
| 2005/0265051 | A1 | 12/2005 | Yamamoto et al. |
| 2006/0092346 | A1 | 5/2006 | Moon et al. |
| 2007/0242477 | A1 | 10/2007 | Yoo et al. |
| 2008/0143916 | A1 | 6/2008 | Fujino et al. |
| 2009/0003002 | A1* | 1/2009 | Sato ................... G02B 6/0043 362/341 |
| 2009/0021932 | A1 | 1/2009 | Kim et al. |
| 2009/0121652 | A1 | 5/2009 | Kang et al. |
| 2009/0135331 | A1 | 5/2009 | Kawase |
| 2009/0167194 | A1 | 7/2009 | Mizuta |
| 2009/0201441 | A1 | 8/2009 | Laney et al. |
| 2009/0302780 | A1 | 12/2009 | Kim et al. |
| 2009/0309498 | A1 | 12/2009 | Park et al. |
| 2009/0310335 | A1 | 12/2009 | Park |
| 2010/0066752 | A1 | 3/2010 | Watanuki |
| 2010/0109562 | A1 | 5/2010 | Shen et al. |
| 2010/0156955 | A1 | 6/2010 | Kimura |
| 2011/0019126 | A1 | 1/2011 | Choi et al. |
| 2011/0050111 | A1 | 3/2011 | Tanaka et al. |
| 2011/0063850 | A1 | 3/2011 | Oide et al. |
| 2011/0304798 | A1 | 12/2011 | Tanaka et al. |
| 2011/0310590 | A1 | 12/2011 | Yamashita et al. |
| 2012/0019490 | A1 | 1/2012 | Huang |
| 2012/0087122 | A1 | 4/2012 | Takeuchi et al. |
| 2012/0133845 | A1* | 5/2012 | Ikuta ................. G02F 1/133608 348/739 |
| 2012/0139445 | A1 | 6/2012 | Fujiwara et al. |
| 2012/0212682 | A1* | 8/2012 | Kuromizu ................ G02B 3/08 348/739 |
| 2012/0218752 | A1 | 8/2012 | Sumitani |
| 2012/0293724 | A1 | 11/2012 | Ueyama |
| 2013/0069560 | A1 | 3/2013 | Kurita |
| 2013/0094187 | A1 | 4/2013 | Kamada |
| 2013/0229596 | A1 | 9/2013 | Hosoki |
| 2014/0211123 | A1 | 7/2014 | Lee et al. |

FOREIGN PATENT DOCUMENTS

| | | |
|---|---|---|
| EP | 2492742 A1 | 8/2012 |
| EP | 3318792 A1 | 5/2018 |
| EP | 3318793 A1 | 5/2018 |
| JP | 2001-338505 A | 12/2001 |
| JP | 2005-109228 A | 4/2005 |
| JP | 2006-128125 A | 5/2006 |
| JP | 2007-322697 A | 12/2007 |
| JP | 2008-166304 A | 7/2008 |
| JP | 2008-270144 A | 11/2008 |
| JP | 2009-032593 A | 2/2009 |
| JP | 2009-140720 A | 6/2009 |
| JP | 2009-162952 A | 7/2009 |
| JP | 2009-222793 A | 10/2009 |
| JP | 2011-034949 A | 2/2011 |
| JP | 2011-090949 A | 5/2011 |
| JP | 2012-004067 A | 1/2012 |
| JP | 2012-089509 A | 5/2012 |
| JP | 2012-119436 A | 6/2012 |
| JP | 2012-174634 | 9/2012 |
| JP | 2012-204337 A | 10/2012 |
| JP | 2012-212509 | 11/2012 |
| JP | 2013-182076 A | 9/2013 |
| JP | 2013-246988 A | 12/2013 |
| JP | 2014-041830 | 3/2014 |
| JP | 2014-067679 | 4/2014 |
| JP | 2014-149529 A | 8/2014 |
| WO | 2008/156020 A1 | 12/2008 |
| WO | 2010/101062 A1 | 9/2010 |
| WO | 2011/058903 A1 | 5/2011 |

OTHER PUBLICATIONS

Extended European Search Report dated Jun. 19, 2018 for the related European Patent Application No. 16841114.8.
Extended European Search Report dated Jun. 26, 2018 for the related European Patent Application No. 16841115.5.
Extended European Search Report dated Jun. 22, 2018 for the related European Patent Application No. 16841116.3.
Extended European Search Report dated Jun. 28, 2018 for the related European Patent Application No. 16841117.1.
Extended European Search Report dated Jun. 14, 2018 for the related European Patent Application No. 16841118.9.
Partial Supplementary European Search Report dated Jun. 27, 2018 for the related European Patent Application No. 16841119.7.
International Search Report of PCT application No. PCT/JP2016/003939 dated Nov. 22, 2016.
International Search Report of PCT application No. PCT/JP2016/003941 dated Nov. 8, 2016.
International Search Report of PCT application No. PCT/JP2016/003942 dated Nov. 22, 2016.
International Search Report of PCT application No. PCT/JP2016/003940 dated Nov. 8, 2016.
International Search Report of PCT application No. PCT/JP2016/003945 dated Nov. 22, 2016.
Extended European Search Report dated Sep. 24, 2018 for the related European Patent Application No. 16841119.7.
Non-Final Office Action issued in U.S. Appl. No. 15/750,883, dated Jan. 9, 2019.
Non-Final Office Action issued in U.S. Appl. No. 15/750,874, dated Dec. 13, 2018.
Non-Final Office Action issued in U.S. Appl. No. 15/750,871, dated Jan. 2, 2019.
Non-Final Office Action issued in U.S. Appl. No. 15/750,886, dated Mar. 21, 2019.
Non-Final Office Action issued in U.S. Appl. No. 15/750,871, dated Jun. 13, 2019.
Notice of Allowance issued in U.S. Appl. No. 15/754,208, dated Jan. 23, 2020.
Final Office Action issued in U.S. Appl. No. 15/750,883, dated Jul. 1, 2019.
Notice of Allowance issued in U.S. Appl. No. 15/750,883, dated Sep. 3, 2019.
Non-Final Office Action issued in U.S. Appl. No. 15/750,886, dated Aug. 8, 2019.
Non-Final Office Action issued in U.S. Appl. No. 15/754,208, dated Aug. 8, 2019.
The EPC Office Action dated Jan. 13, 2020 for the related European Patent Application No. 16841115.5.

* cited by examiner

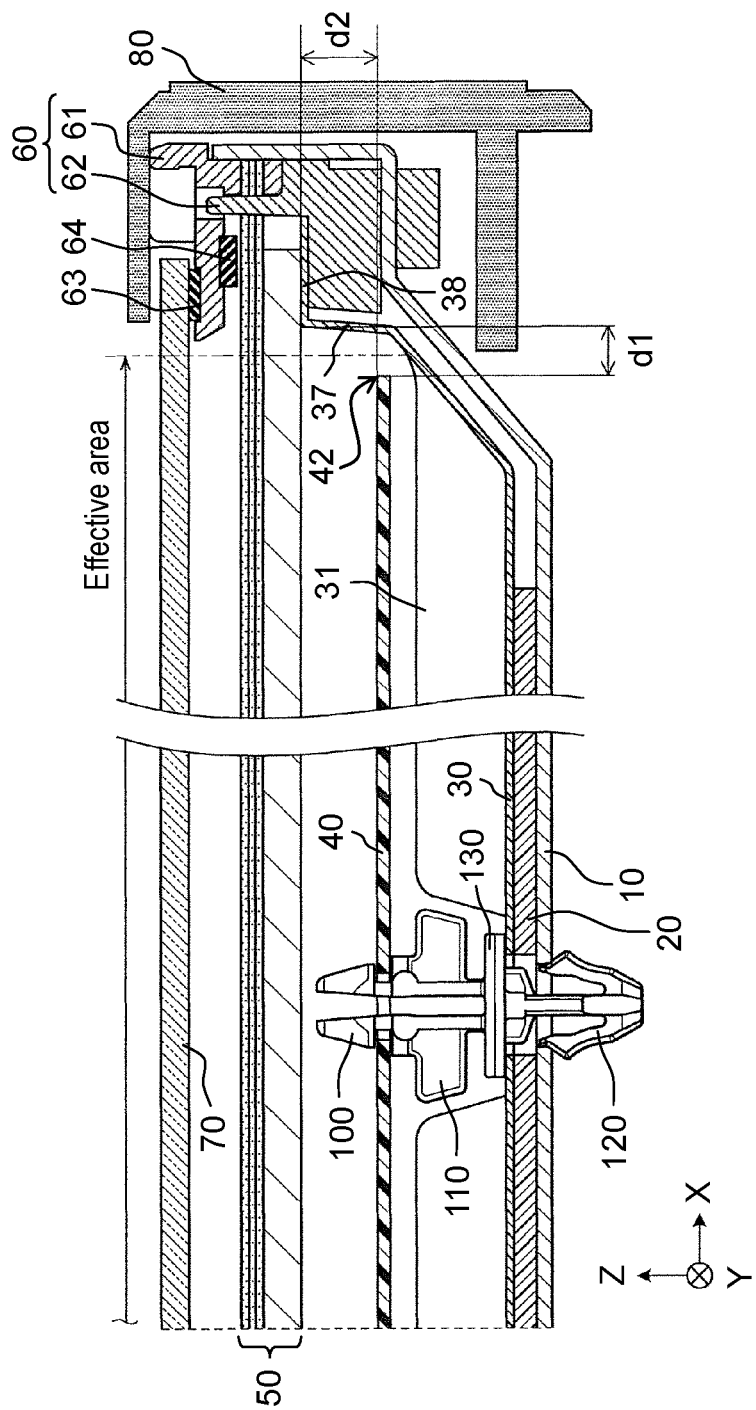

VIDEO DISPLAY DEVICE

This application is a U.S. national stage application of the PCT International Application No. PCT/JP2016/003943 filed on Aug. 30, 2016, which claims the benefit of foreign priority of Japanese patent applications No. 2015-172363 filed on Sep. 1, 2015 and No. 2016-047678 filed on Mar. 10, 2016, the contents all of which are incorporated herein by reference.

TECHNICAL FIELD

The present disclosure relates to a video display device including a backlight.

BACKGROUND ART

For example, various technologies for improving quality of images formed by a video display device including a backlight, such as a liquid crystal display device, have been continuously developed. A technology called direct-backlight local dimming is one of examples of these technologies.

Patent Literature 1 discloses a technology relating to local dimming

Patent Literature 2 discloses a technology which provides a lens on each of a plurality of light sources included in a direct-backlight video display device to diffuse light emitted from the plurality of light sources and thereby uniformize luminance distribution of the light emitted from the plurality of light sources.

CITATION LIST

Patent Literature

PTL 1: Unexamined Japanese Patent Publication No. 2014-41830
PTL 2: Unexamined Japanese Patent Publication No. 2014-67679

SUMMARY

According to the technologies disclosed in Patent Literature 1 and Patent Literature 2, however, luminance lowering or luminance non-uniformity may be caused at an end of an image display area of a display panel (effective area for image display, hereinafter only referred to as "effective area" as well).

Provided according to the present disclosure is a video display device capable of reducing luminance lowering or luminance non-uniformity caused at an end of an effective area of a display panel.

A video display device according to an aspect of the present disclosure includes: a display panel that displays an image based on an input image signal; a light source substrate that includes a plurality of light sources on a main surface which is a front side of the light source substrate, and emits, toward a rear side of the display panel, light emitted from the plurality of light sources; a reflection sheet that is provided on the main surface of the light source substrate, and in which hollow partitioning walls each of which separates adjacent two light sources of the plurality of light sources are formed; and an optical member that has a plate shape, is provided between the display panel and the light source substrate, and uniformizes luminance distribution of the light emitted from the light source substrate. The reflection sheet extends to an outside of an outer peripheral edge of the optical member as viewed from the front side.

The video display device according to the present disclosure is capable of reducing luminance lowering or luminance non-uniformity caused at an end of an effective area of the display panel.

BRIEF DESCRIPTION OF DRAWINGS

FIG. 10 is a cross-sectional view schematically illustrating an example of a structure in a vicinity of an end of the video display device according to the first exemplary embodiment.

Figure 1:
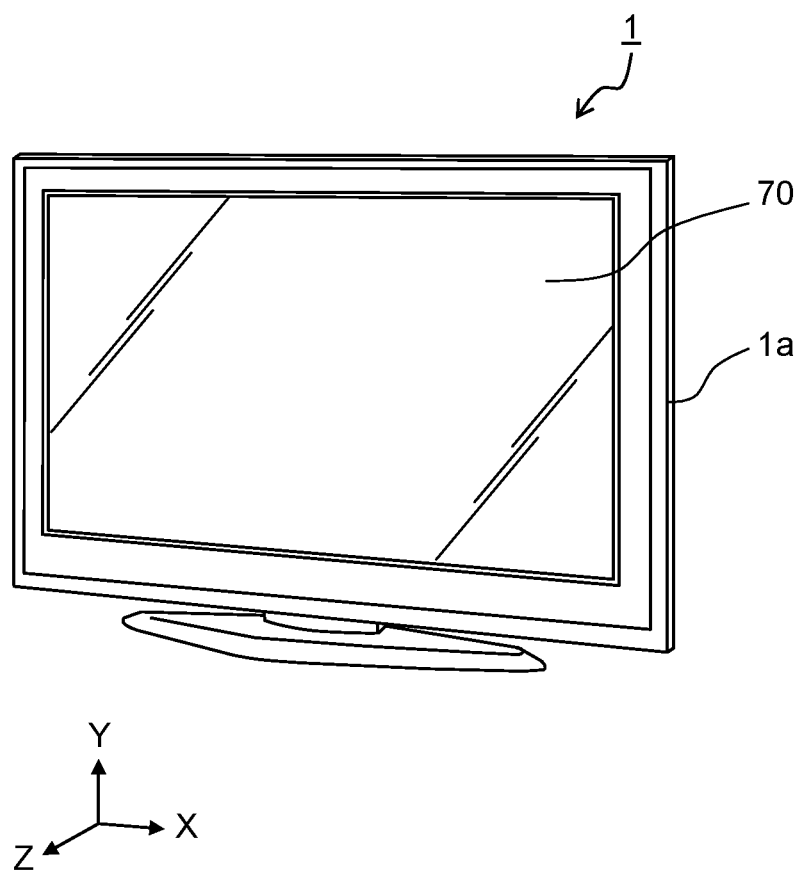
FIG. 1 is a view schematically illustrating an example of an external appearance of a video display device according to a first exemplary embodiment.

DESCRIPTION OF EMBODIMENTS (Knowledge on which the Present Disclosure is Based)

The inventors of the present application have found that following problems occur in a conventional video display device.

According to a video display device using the technology disclosed in Patent Literature 2, for example, light emitted from light sources is diffused by lenses. When the number of the light sources is relatively small, ends of an effective area of a display panel are located at relatively long distances from the light sources. In this case, luminance easily lowers. One of possible solutions for this problem may be to provide a larger number of the light sources. The larger number of light sources can secure sufficient luminance at the ends of the effective area of the display panel.

In case of the video display device which uses the technology disclosed in Patent Literature 2, however, the lens is provided for each of the plurality of light sources. In this case, the number of lenses increases in accordance with the increase in the number of light sources. Moreover, each of the lenses needs to be accurately positioned at appropriate locations for the corresponding light sources. Accordingly, there is a problem where a step for positioning the lenses increases in a manufacturing step of the video display device with increase in the number of light sources. As understood from above, the video display device which diffuses light by using lenses requires a larger number of lenses and increases the manufacturing step to reduce luminance lowering or luminance non-uniformity at the ends of the effective area of the display panel. Accordingly, reduction of these problems is not easily achieved by this type of video display device.

The inventors of the present application have examined such a configuration which provides an optical member (flatter) for uniformizing luminance distribution of light emitted from the plurality of light sources in place of the lenses provided for each of the plurality of light sources. The flatter requires less positioning accuracy than the positioning accuracy for lenses. Moreover, the flatter is provided as one optical member. Accordingly, positioning of the flatter is easier than positioning of a plurality of lenses. In this case, uniformization of luminance distribution (improvement of uniformity of luminance distribution) of light emitted from a plurality of light sources can be achieved only by providing the flatter constituting one component. Accordingly, a video display device which uses the flatter for uniformizing luminance distribution of light is allowed to increase the number of light sources more easily than the video display device which diffuses light emitted from the light sources by using lenses. More specifically, the video display device which uses the flatter is allowed to more easily position the light sources to a vicinity of an end of the effective area of the display panel, wherefore luminance at the end of the effective area of the display panel can be more easily improved. The video display device which uses the flatter may include a reflection sheet which reflects light of the light sources toward a front (display panel side). In this case, the flatter is disposed on the front (display panel side) of the reflection sheet.

However, in case of the video display device which uses the flatter and includes the light sources positioned in the vicinity of the end of the effective area of the display panel, luminance lowering or luminance non-uniformity may be caused at the end of the effective area of the display panel when a positional relationship between light reflected on an end of the reflection sheet and an end of the flatter is not sufficiently considered. Accordingly, sufficient consideration is needed for the positional relationship between the end of the reflection sheet and the end of the flatter in the video display device which uses the flatter.

A video display device according to an aspect of the present disclosure includes: a display panel that displays an image based on an input image signal; a light source substrate that includes a plurality of light sources on a main surface which is a front side of the light source substrate, and emits, toward a rear side of the display panel, light emitted from the plurality of light sources; a reflection sheet that is provided on the main surface of the light source substrate, and in which hollow partitioning walls each of which separates adjacent two light sources of the plurality of light sources are formed; and an optical member that has a plate shape, is provided between the display panel and the light source substrate, and uniformizes luminance distribution of the light emitted from the light source substrate. The reflection sheet extends to an outside of an outer peripheral edge of the optical member as viewed from the front side.

According to this configuration, the reflection sheet is so disposed as to extend to the outside of the outer peripheral edge of the optical member as viewed from the front side. In this case, the reflection sheet disposed even in an area outside the optical member can reflect light emitted from the light sources. Accordingly, luminance lowering or luminance non-uniformity can decrease even at the end of the effective area of the display panel. In other words, according to this configuration, reduction of luminance lowering or luminance non-uniformity at the end of the effective area of the display panel can be achieved by a relatively simplified configuration.

For example, an outer peripheral portion of the reflection sheet may be formed in a direction crossing the optical member, and may be disposed on an extension line of the optical member.

According to this configuration, the optical member and the reflection sheet can be disposed such that an end of the optical member and the reflection sheet face each other with a clearance left between the optical member and the reflection sheet. Accordingly, the reflection sheet can be configured such that a part of light emitted from the light sources is reflected on an end side (end side of effective area of display panel), i.e., a portion easily lowering luminance, and travels toward a center of the effective area of the display panel. Accordingly, effective reduction of luminance lowering or luminance non-uniformity can be achieved by a relatively simplified configuration even at the end of the effective area of the display panel.

For example, the outer peripheral portion of the reflection sheet may be disposed on front of the optical member.

According to this configuration, a part of light emitted from the light sources can be reflected even on the front side of the optical member toward the center of the effective area of the display panel. Accordingly, effective reduction of luminance lowering or luminance non-uniformity can be achieved by a relatively simplified configuration even at the end of the effective area of the display panel.

For example, the outer peripheral edge of the optical member may be disposed inside an effective area of the display panel as viewed from the front side. The outer peripheral portion of the reflection sheet may be disposed outside the effective area of the display panel as viewed from the front side.

According to this configuration, a clearance between the optical member and the reflection sheet can be so provided as to cross the end of the effective area of the display panel. According to this configuration, a part of light emitted from the light sources can be reflected from the outside of the end of the effective area of the display panel toward the center of the effective area of the display panel. Accordingly, effective reduction of luminance lowering or luminance non-uniformity can be achieved by a relatively simplified configuration even at the end of the effective area of the display panel.

Exemplary embodiments are hereinafter described in detail with reference to the drawings as necessary. However, excessive details may be omitted in the following description. For example, detailed description of well-known matters, and repetitive description of substantially identical configurations may be omitted. This omission is made for avoiding excessive redundancy of the following description, and facilitating understanding by those skilled in the art.

Note that each of the exemplary embodiments described herein is only presented as a specific example of the present disclosure. Numerical values, shapes, materials, constituent elements, and positions and connection manners of the constituent elements included in the following exemplary embodiments are presented by way of example, and not intended to limit the subject matters of the present disclosure. In addition, constituent elements included in the following exemplary embodiments and not contained in the independent claims defining the highest concepts are described as optional constituent elements.

Note that the accompanying drawings and the following description are presented to help those skilled in the art fully understand the present disclosure. It is therefore not intended that the subject matters defined in the appended claims be limited to those drawings and description.

Moreover, the respective figures are schematic views and not necessarily precise depictions. Furthermore, substantially identical constituent elements in the respective figures have been given identical reference numbers. Description of these elements are omitted or simplified in some cases.

First Exemplary Embodiment

Video display device 1 according to a first exemplary embodiment is hereinafter described with reference to FIGS. 1 through 10. It is assumed that three axes of X axis, Y axis, and Z axis are defined in the respective figures in this exemplary embodiment. The X axis is an axis extending in a direction in parallel with a long side of a display panel (horizontal direction in FIG. 1). The Y axis is an axis extending in parallel with a short side of the display panel (vertical direction in FIG. 1). The Z axis is an axis perpendicular to both the X and Y axes (direction in parallel with front-rear direction of video display device 1). However, these axes are defined only for convenience and not intended to limit the present disclosure.

[1-1. Configuration]

Video display device 1 according to the first exemplary embodiment is a liquid crystal display device which includes a liquid crystal display panel as a display panel, and light source substrates for illuminating the display panel from a rear side of the display panel. Video display device 1 is an example of a video display device. Mounted on each of the light source substrates are a plurality of light sources each of which is provided in corresponding one of areas different from each other in the display panel, and further are driver elements for driving (dimming) each of the plurality of light sources such that light is emitted from the light sources with luminance corresponding to brightness indicated by a control signal (brightness of an image within the corresponding area). Note that brightness of an image within the corresponding area in this context refers to brightness of the image in the area of the display panel illuminated by one light source (i.e., partial brightness of the image in the area corresponding to the light source).

FIG. 1 is a view schematically illustrating an example of an external appearance of video display device 1 according to the first exemplary embodiment.

As illustrated in FIG. 1, video display device 1 has an external appearance of an ordinary flat panel display, and includes display panel 70 and light source substrates (not shown in FIG. 1). Display panel 70 and the light source substrates are stored in housing 1a having an opened front surface. According to this exemplary embodiment, surfaces of video display device 1 and respective constituent members of video display device 1 facing a user (surface on the side illustrated in FIG. 1) are referred to as front surfaces, while surfaces on the side opposite to the front surfaces (back surfaces) are referred to as rear surfaces.

Figure 2:
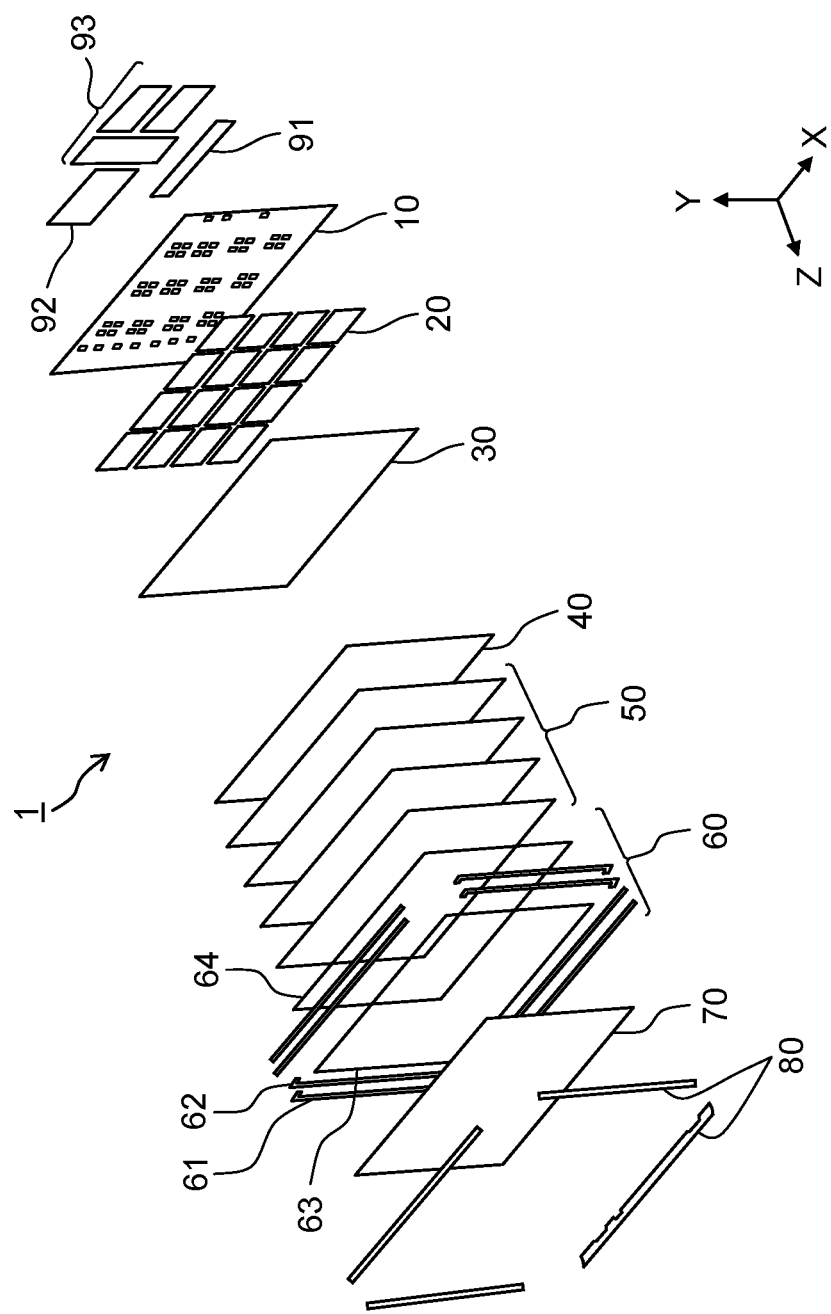
FIG. 2 is an exploded perspective view schematically illustrating an example of a configuration of the video display device according to the first exemplary embodiment.

FIG. 2 is an exploded perspective view schematically illustrating an example of a configuration of video display device 1 according to the first exemplary embodiment.

Figure 3:
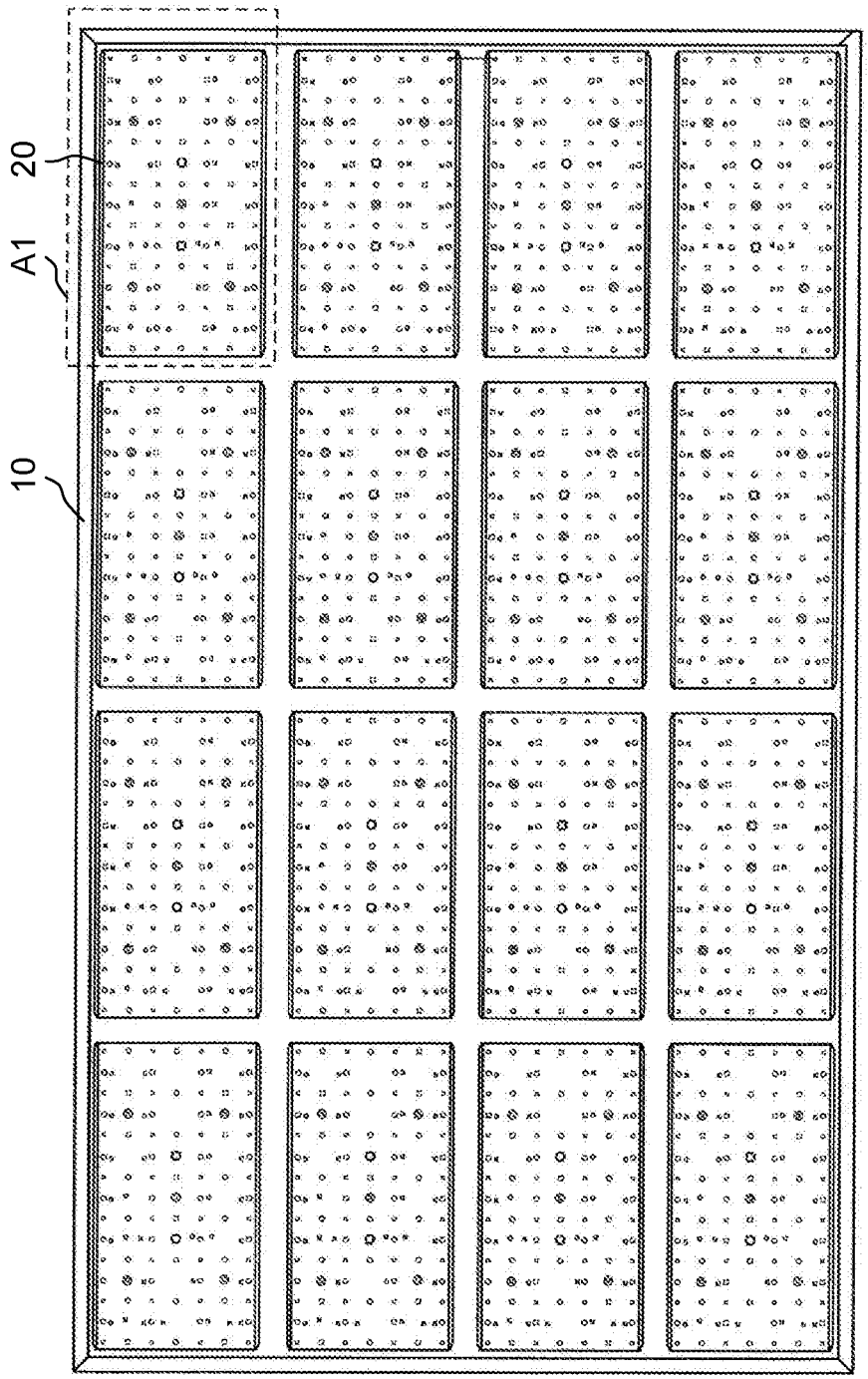
FIG. 3 is a plan view schematically illustrating an example of a base plate to which light source substrates included in the video display device according to the first exemplary embodiment have been attached.

FIG. 3 is a plan view schematically illustrating an example of base plate 10 to which light source substrates 20 included in video display device 1 according to the first exemplary embodiment have been attached. Note that FIG. 3 illustrates a plan view as viewed from a front side of base plate 10.

As illustrated in FIG. 2, video display device 1 includes base plate 10, a plurality of light source substrates 20, reflection sheet 30, flatter 40, various types of optical sheets 50, mold frame 60, display panel 70, bezel 80, connection terminal substrate 91, signal processing substrate 92, and power supply substrate 93. These members are stored in housing 1a (see FIG. 1) to constitute video display device 1. Note that video display device 1 further includes support members, a fastening member, a reinforcing member and the like not shown in the figures, besides the foregoing members. These not-shown parts will be described below as necessary.

Base plate 10 is a support substrate corresponding to a base to which light source substrates 20, connection terminal substrate 91, signal processing substrate 92, and power supply substrate 93 are attached. Base plate 10 is made of sheet metal, for example, but may be made of other materials. Base plate 10 includes through holes and screw holes formed for attachment of the support members, openings formed for connection between light source substrates 20 via cables passing through a rear side of base plate 10, and others.

Light source substrates 20 constitute a backlight module provided on a rear side of display panel 70 and illuminating the rear side of display panel 70. Each of light source substrates 20 includes a plurality of light sources disposed on a main surface which is a front side of light source substrate 20, and applies light emitted from the plurality of light sources to the rear side of display panel 70. Each of light source substrates 20 further includes driver elements disposed on the main surface which is a front side of light source substrate 20 to drive each of the plurality of light sources. Each of the plurality of light sources is constituted by a light emitting diode (LED). Accordingly, each of the plurality of light sources is a point light source. As illustrated in FIG. 3, the plurality of light source substrates 20 having an identical shape are disposed in matrix and attached to a front surface (surface on the side toward display panel 70) of base plate 10. The plurality of light source substrates 20 constitute a direct-type backlight for illuminating display panel 70. Light source substrate 20 will be detailed below.

Reflection sheet 30 is disposed on main surfaces of light source substrates 20 (surfaces on the side toward display panel 70) where the plurality of light sources are provided. Reflection sheet 30 includes openings penetrated by light sources (light sources 21 of light source substrates 20 illustrated in FIG. 4). Reflection sheet 30 is a sheet configured such that a part of light emitted from the light sources and reflected on reflection sheet 30 travels toward the front side (toward display panel 70). Reflection sheet 30 is made of white synthetic resin, for example, but may be made of other white materials. Hollow partitioning walls (see FIG. 5) each of which protrudes toward the front side and separates adjacent two light sources of the plurality of light sources are formed in reflection sheet 30. Accordingly, each periphery of the light sources is surrounded by the corresponding partitioning walls, in which condition each of the light sources illuminates an area surrounded by the corresponding partitioning walls around the corresponding light source. Reflection sheet 30 will be detailed below.

Flatter 40 is a sheet-shaped optical member provided on the front side (the side toward display panel 70) of reflection sheet 30 to uniformize luminance distribution of light emitted from light source substrates 20 (to improve uniformity of luminance distribution). Flatter 40 transmits light emitted from the light sources not uniformly, but with distribution of light transmittance (hereinafter also abbreviated as "transmittance") produced in each of the areas illuminated by the light sources. Note that distribution of transmittance in this exemplary embodiment refers to a state of a presence of distribution containing relatively high-transmittance portions and relatively low-transmittance portions. Flatter 40 is made of synthetic resin, for example, but may be made of other materials. When flatter 40 is absent, luminance differences may be produced in the areas illuminated by the light sources of light source substrates 20 in a state that each of the light sources of light source substrates 20 is a point light source constituted by an LED as described above. Flatter 40 is configured to produce transmittance distribution determined to cancel these luminance differences as predetermined transmittance distribution. Accordingly, luminance at each of different positions within the area illuminated by the corresponding light source can approach uniform luminance by the presence of flatter 40, wherefore uniformity of luminance within the corresponding area can increase. As described above, flatter 40 is provided between display panel 70 and light source substrates 20 to uniformize luminance distribution of light emitted from light source substrates 20 (to increase uniformity of luminance distribution). Flatter 40 will be detailed below.

Optical sheets 50 are sheets disposed between display panel 70 and flatter 40 to perform various types of optical functions other than the function of flatter 40. For example, optical sheets 50 include a diffusion plate which diffuses light to further increase uniformity of luminance, a prism sheet which equalizes traveling paths of light into a frontward direction to increase luminance visually recognized by the user, and others. For example, optical sheets 50 may be constituted by synthesis resin on which surface fine shapes corresponding to respective functions are formed. Appropriate effects of optical sheets 50 are produced when a distance between the light sources of light source substrates 20 and optical sheets 50 falls within a predetermined range. Accordingly, it is preferable that the distance between optical sheets 50 and the light sources be maintained within an appropriate range (such as a range not smaller than a second predetermined clearance).

Mold frame 60 is a support member which supports outer peripheries of display panel 70, optical sheets 50, and reflection sheet 30 from the rear surface. Mold frame 60 is made of synthetic resin, for example, but may be made of other materials. More specifically, mold frame 60 includes first mold frame 61 which supports the outer peripheral portion of display panel 70 from the rear of display panel 70, and second mold frame 62 which supports the outer peripheries of optical sheets 50 and reflection sheet 30 from the rear. Mold frame 60 further includes cushion member 63 disposed between display panel 70 and first mold frame 61, and cushion member 64 disposed between first mold frame 61 and optical sheets 50 (see FIG. 10). Mold frame 60 may be fixed to base plate 10. In addition, first mold frame 61 and second mold frame 62 of mold frame 60 may be formed integrally with each other.

Display panel 70 is a liquid crystal panel for image display constituted by a plurality of pixels arranged in matrix. Display panel 70 displays an image based on an image signal input to a driving circuit (not shown).

Bezel 80 is a support member which supports the outer periphery of display panel 70 from the front surface. Bezel 80 is made of metal, for example, but may be made of synthetic resin.

Connection terminal substrate 91 is a circuit substrate which includes terminals and an interface circuit for receiving image signals. Signal processing substrate 92 is a circuit substrate which includes a signal processing circuit for processing image signals. Signal processing substrate 92 further includes a circuit which generates control signals for controlling (dimming) luminance of the light sources of light source substrates 20 based on image signals. Power supply substrate 93 is a circuit substrate which includes a power supply circuit for supplying operation power (hereinafter also abbreviated as "power") to video display device 1. Connection terminal substrate 91, signal processing substrate 92, and power supply substrate 93 are attached to the rear surface of base plate 10.

Light source substrates 20 are hereinafter described.

Figure 4:
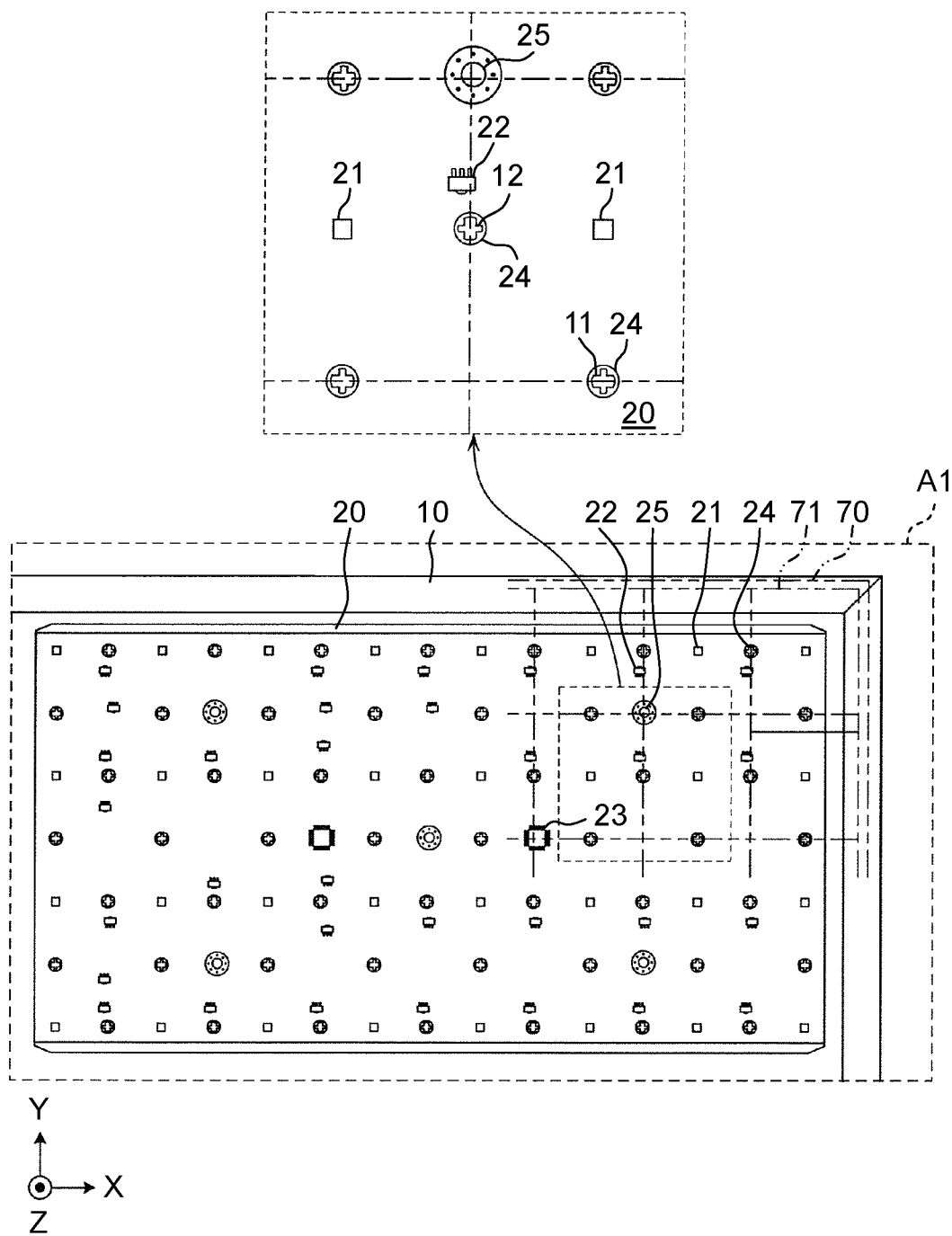
FIG. 4 is a plan view schematically illustrating an example of a configuration of the light source substrate included in the video display device according to the first exemplary embodiment.

FIG. 4 is a plan view schematically illustrating an example of a configuration of each of light source substrates 20 included in video display device 1 according to the first exemplary embodiment. A view shown in a lower part of FIG. 4 is an enlarged view of area A1 of FIG. 3. FIG. 4 illustrates an example of respective members disposed on the front surface of light source substrate 20. Note that a view in an upper part of FIG. 4 is an enlarged view (partial enlarged view) of an area surrounded by a broken line in the figure in the lower part of FIG. 4. In addition, positions corresponding to areas 71 of display panel 70 illuminated by respective light sources 21 are indicated by alternate long and two short dashes lines in a part of FIG. 4 for convenience to facilitate visual understanding.

As illustrated in FIG. 4, the plurality of light sources 21, and the plurality of driver elements 22 and driver elements 23 are mounted on light source substrate 20.

Each of light sources 21 is provided on corresponding one of areas 71 different from each other in display panel 70. Each of light sources 21 is constituted by a high-voltage LED. The high-voltage LED in this context refers to an LED constituted by a plurality of LED elements (i.e., a plurality of pn junctions) connected in series. The high-voltage LED is an LED to which higher voltage is applicable than a single LED element (low-voltage LED). Moreover, when higher voltage is applied, the high-voltage LED can provide higher light emission luminance than a single LED element in a state of flow of substantially the same current.

Each of driver elements 22 and driver elements 23 is a semiconductor element for driving light sources 21 based on a control signal supplied from signal processing substrate 92. A control signal indicating brightness of an image in area 71 associated with each of light sources 21 is supplied from signal processing substrate 92 to corresponding driver element 22 and driver element 23. In this case, driver element 22 and driver element 23 drive (dim) corresponding light source 21 such that light is emitted with luminance corresponding to the brightness indicated by the control signal. Each of driver elements 22 may be constituted by a metal-oxide semiconductor (MOS) transistor, for example. Each of driver elements 23 may be constituted by a semiconductor integrated circuit (IC) which generates a gate signal of driver element 22 from a control signal, for example.

In light source substrate 20, includes openings 24 penetrated by support members supporting flatter 40, and screw holes 25 which receive screws fastened to fix light source substrates 20 to base plate 10 are formed. On the other hand, base plate 10 to which light source substrates 20 are attached includes through holes 11 and through holes 12 each of which has a shape smaller than each shape of openings 24, and receives a support member to stand the support member on base plate 10.

Through holes 11, through holes 12, and screw holes (not shown) on base plate 10 are disposed on boundaries of adjoining areas 71. Similarly, each of driver elements 22, driver elements 23, openings 24, and screw holes 25 on light source substrate 20 are disposed on boundaries of adjoining areas 71.

Reflection sheet 30 is hereinafter described.

Figure 5:
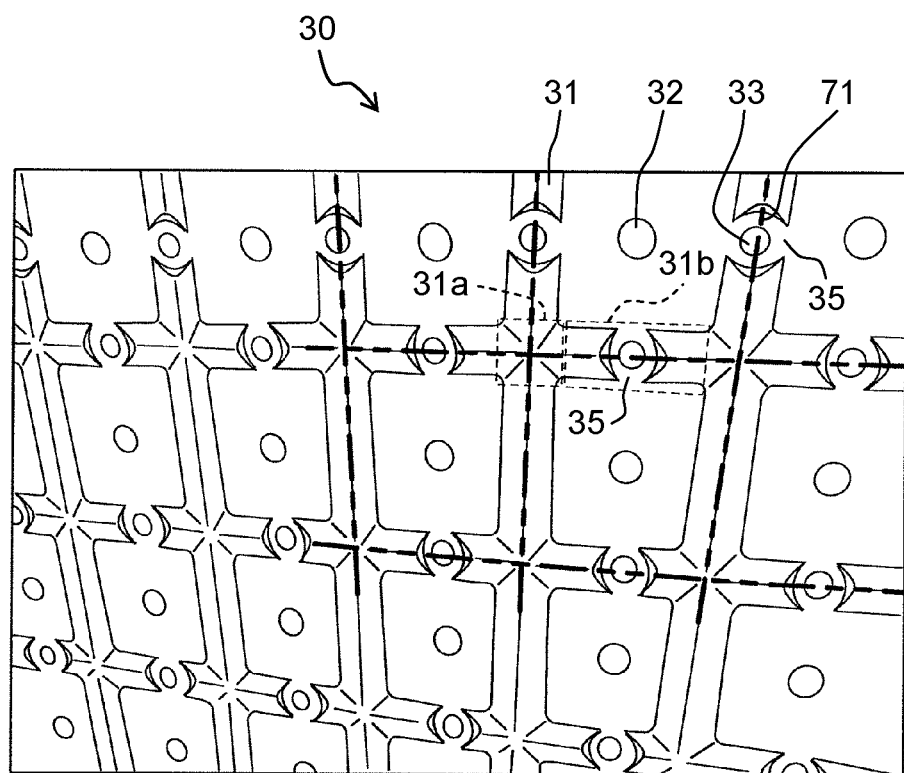
FIG. 5 is a perspective view schematically illustrating an example of a shape of a reflection sheet included in the video display device according to the first exemplary embodiment.

FIG. 5 is a perspective view schematically illustrating an example of a shape of reflection sheet 30 included in video display device 1 according to the first exemplary embodiment. Positions corresponding to areas 71 are indicated by alternate long and two short dashes lines in a part of FIG. 5 for facilitating visual understanding.

As illustrated in FIG. 5, reflection sheet 30 includes partitioning walls 31, openings 32, and openings 33.

Openings 32 are provided at positions corresponding to light sources 21 of light source substrate 20 disposed on the rear side of reflection sheet 30. Light sources 21 are exposed from the rear surface of reflection sheet 30 through openings 32 toward the front surface of reflection sheet 30.

Reflection sheet 30 is made of white synthetic resin to reflect light emitted from light sources 21. Light is emitted from light sources 21 penetrating openings 32 and exposed to the front surface, a part of which light (light such as traveling rearward) is reflected on reflection sheet 30 toward the front side (toward display panel 70).

Each of partitioning walls 31 formed by reflection sheet 30 is a hollow part which protrudes toward the front side (toward display panel 70, plus side in Z axis direction (see FIGS. 2 and 4). Each of partitioning walls 31 is formed at a position separating adjacent ones of openings 32 (i.e., adjacent ones of light sources 21). Each of partitioning walls 31 of reflection sheet 30 includes intersection portion 31a at which a portion extending in a first direction and a portion extending in a second direction cross each other, and linear portion 31b extending in parallel with the first direction or the second direction. The first direction corresponds to the X axis direction, for example, while the second direction corresponds to the Y axis direction (see FIGS. 2 and 4), for example. However, the first and second directions according to the present disclosure are not limited to these specific directions. For example, the respective directions may be oppositely defined.

In addition, linear portion 31b of each of partitioning walls 31 includes recess portion 35. Each of recess portions 35 is formed so that a part of corresponding partitioning wall 31 does not protrude. Each of recess portions 35 is formed in corresponding partitioning wall 31 disposed at least in either one of the first direction (such as X axis direction) and the second direction (such as Y axis direction) with respect to openings 32 (in other words, light sources 21). In other words, each of recess portions 35 is formed at least in corresponding partitioning wall 31 disposed in the first direction with respect to corresponding opening 32 (light source 21), or in corresponding partitioning wall 31 disposed in the second direction with respect to corresponding opening 32 (light source 21).

In addition, frontward protrusion of each of partitioning walls 31 becomes largest on the corresponding boundary line of adjoining areas 71. Each thickness of partitioning walls 31 decreases in the direction toward the front side (i.e., width in the direction perpendicular to the extension direction of linear portion 31b decreases). More specifically, each of partitioning walls 31 has inclined surface 31c inclined to a display surface of display panel 70. Inclined surface 31c is inclined in such a direction as to decrease the thickness of partitioning wall 31 (see FIG. 7). Each of inclined surfaces 31c is configured such that light emitted from light source 21 toward partitioning wall 31 is reflected on inclined surface 31c toward the front side (toward display panel 70).

Opening 33 is formed at each of recess portions 35 of partitioning walls 31 of reflection sheet 30. Support members penetrate openings 33 as described below.

Flatter 40 is hereinafter described.

Figure 6:
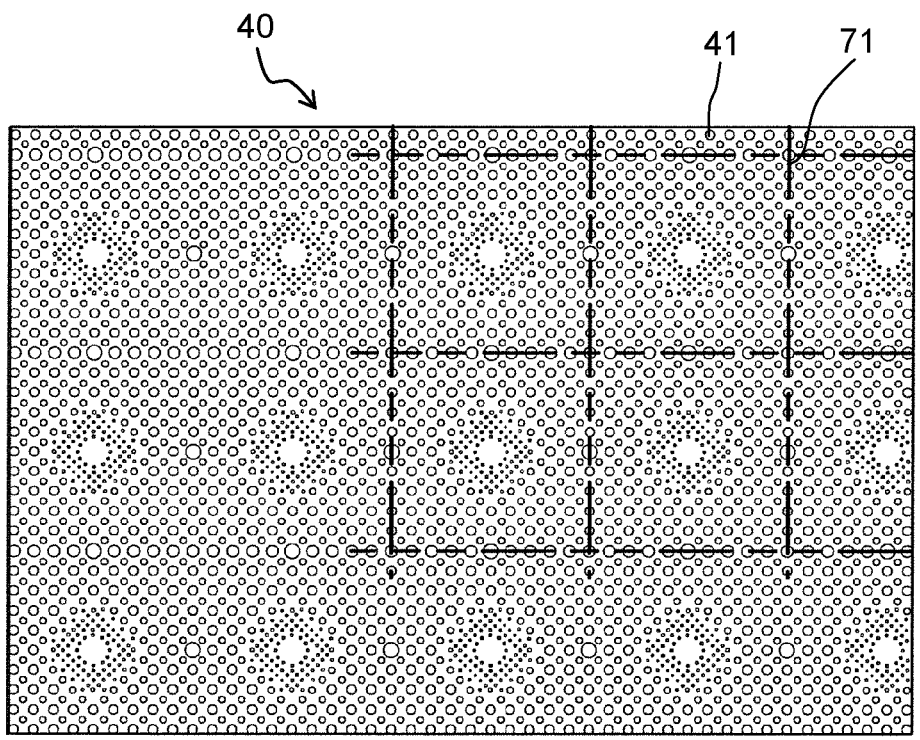
FIG. 6 is a plan view schematically illustrating an example of a shape of a flatter included in the video display device according to the first exemplary embodiment.

FIG. 6 is a plan view schematically illustrating an example of a shape of flatter 40 included in video display device 1 according to the first exemplary embodiment. Positions corresponding to areas 71 are indicated by alternate long and two short dashes lines in a part of FIG. 6 for facilitating visual understanding.

As illustrated in FIG. 6, holes 41 in various sizes are formed in a sheet of flatter 40 made of synthetic resin. Flatter 40 controls transmittance of light by using holes 41. More specifically, flatter 40 has distribution of transmittance within areas 71 in accordance with a layout (size, position, number) of holes 41. Distribution of transmittance of flatter 40 is so designed as to cancel luminance distribution (luminance variations) which may be produced by light sources 21 within areas 71 when flatter 40 is absent. Flatter 40 therefore exhibits predetermined transmittance distribution determined to cancel luminance distribution produced by light sources 21. This configuration of flatter 40 can improve luminance uniformity within areas 71. Note that the transmittance distribution of flatter 40 is so designed as to obtain appropriate effects when a distance between flatter 40 and light sources 21 is maintained at a predetermined distance (hereinafter referred to as first predetermined clearance). It is therefore preferable that the clearance between flatter 40 and light sources 21 is maintained at the first predetermined clearance to obtain appropriate effects produced by flatter 40.

Attachment of reflection sheet 30 to light source substrate 20 by using support member 100 is hereinafter described.

Figure 7:
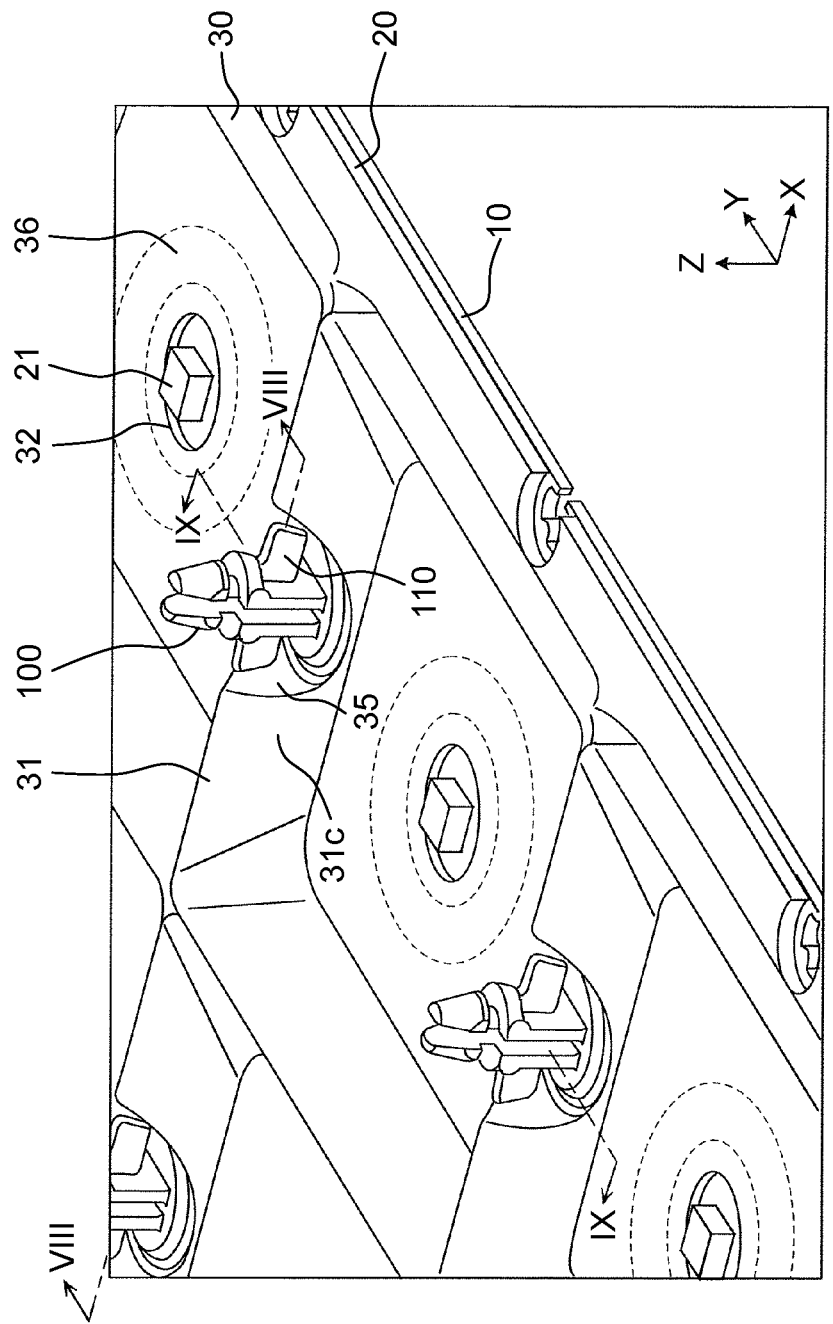
FIG. 7 is a perspective view schematically illustrating an attachment example of the reflection sheet attached to the light source substrate in the video display device according to the first exemplary embodiment.

FIG. 7 is a perspective view schematically illustrating an attachment example of reflection sheet 30 attached to light source substrate 20 in video display device 1 according to the first exemplary embodiment.

Figure 8:
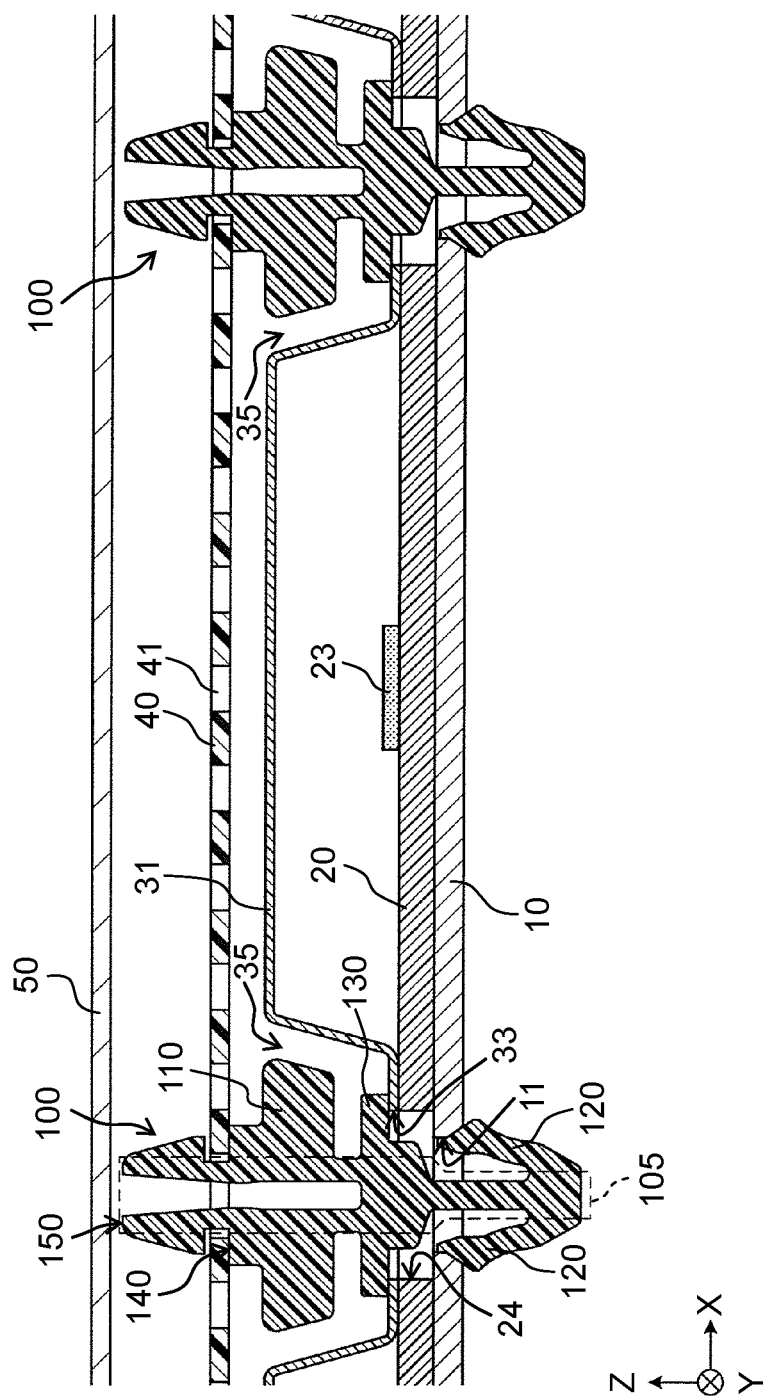
FIG. 8 is a cross-sectional view schematically illustrating an example of a layout of respective members in the video display device according to the first exemplary embodiment.
Figure 9:
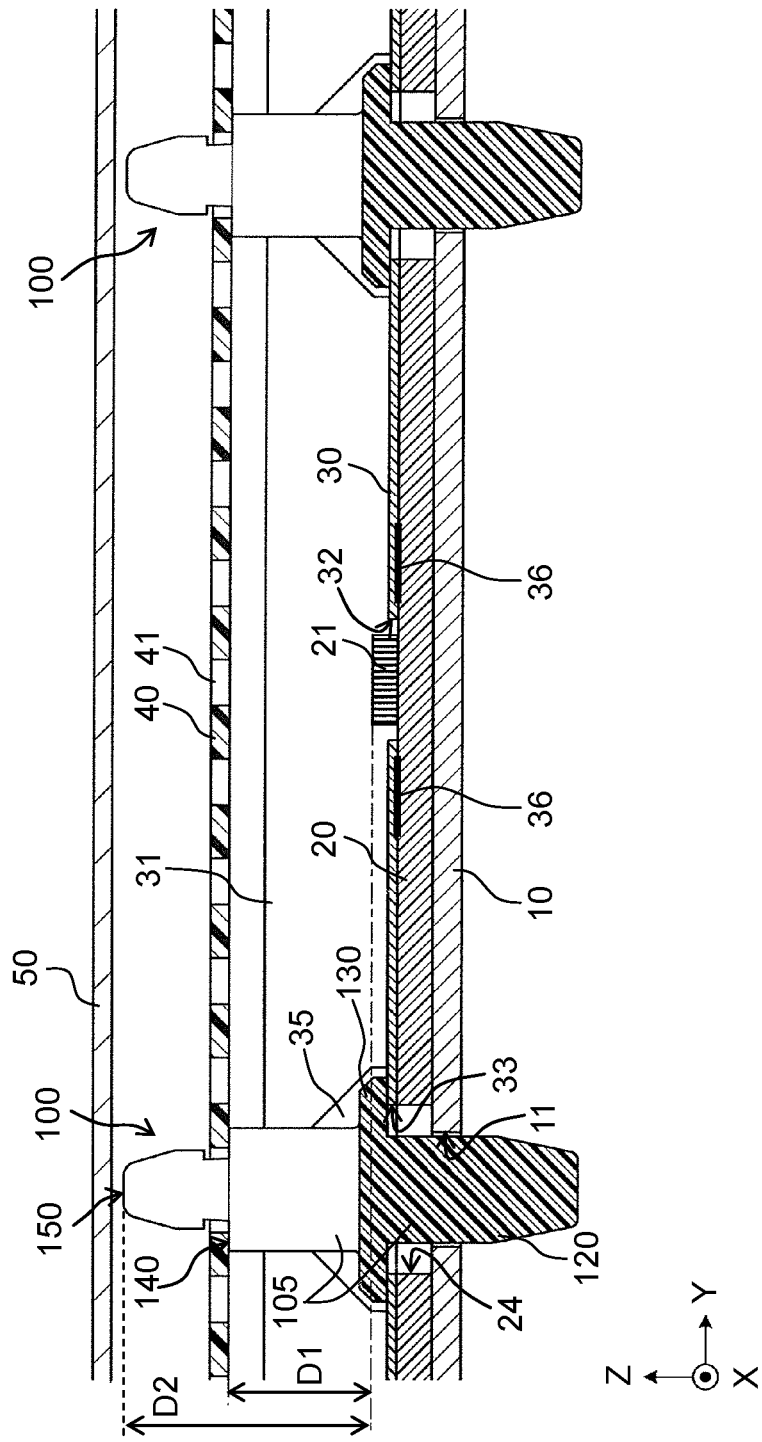
FIG. 9 is a cross-sectional view schematically illustrating an example of a layout of respective members in the video display device according to the first exemplary embodiment.

FIGS. 8 and 9 are cross-sectional views schematically illustrating an example of a layout of respective members included in video display device 1 according to the first exemplary embodiment. FIG. 8 illustrates a cross-sectional view taken along a line VIII-VIII in FIG. 7, while FIG. 9 illustrates a cross-sectional view taken along a line IX-IX in FIG. 7. FIG. 7 does not show flatter 40 and optical sheets 50, while FIGS. 8 and 9 illustrate flatter 40 and optical sheets 50.

As illustrated in FIGS. 7 through 9, support member 100 includes wall portion 110 which has a shape corresponding to a shape of recess portion 35 of partitioning wall 31. Support member 100 further includes shaft portion 105, engaging portion 120, and plate portion 130. Shaft portion 105 penetrates through hole 11 of base plate 10, opening 24 of light source substrate 20, opening 33 of reflection sheet 30, and hole 41 of flatter 40. Base plate 10, light source substrate 20, and reflection sheet 30 are sandwiched between engaging portion 120 and plate portion 130 in a state that support member 100 is attached to through hole 11 of base plate 10. Reflection sheet 30 is attached to light source substrate 20 and base plate 10 in this manner. Support member 100 is made of white synthetic resin, for example, but may be made of other materials.

In addition, a flat portion of reflection sheet 30 around opening 32 through which light source 21 penetrates for exposure is affixed to light source substrate 20 via adhesive tape 36 (see FIGS. 7 and 9). Reflection sheet 30 is fixed to light source substrate 20 in this manner.

Light source 21 of light source substrate 20 penetrates from the rear surface of reflection sheet 30 through opening 32 for exposure to the front surface of reflection sheet 30 (see FIGS. 7 and 9). Driver element 23 of light source substrate 20 is stored in a space inside partitioning wall 31 (space formed by partitioning wall 31 between the rear surface of reflection sheet 30 and the front surface of light source substrate 20) (see FIG. 8).

While not shown in FIGS. 7 through 9, light source substrate 20 is fixed to base plate 10 via a screw passing through screw hole 25 (see FIG. 4) and attached to base plate 10. In this case, a head portion of the screw, driver element 22 and others are also stored within partitioning wall 31.

Moreover, a portion of shaft portion 105 of support member 100 on the front side with respect to wall portion 110 (the side toward display panel 70, plus side in the Z axis direction in FIG. 7) penetrates particular hole 41 of flatter 40 (see FIGS. 8 and 9). Support member 100 supports flatter 40 via support surface 140 provided in a notch in an upper portion of support member 100 by engagement between particular hole 41 formed in flatter 40 and the notch. As illustrated in FIG. 9, support surface 140 of support member 100 regulates approach of flatter 40 toward light source 21 in excess of first predetermined clearance D1.

Base plate 10, light source substrate 20, reflection sheet 30, and flatter 40 are joined to each other to form one structure body in the foregoing manner by the use of support member 100. Provided thereafter are various types of optical sheets 50 on the front side of the structure body (the side toward display panel 70), and display panel 70 on the front side of optical sheets 50 to constitute video display device 1 as illustrated in FIG. 2. According to video display device 1, display panel 70 is illuminated from the rear side with more uniform light emitted from light sources 21 of light source substrate 20 and passing through flatter 40 and the plurality of optical sheets 50. In this case, brightness of the light illuminating display panel 70 from the rear side is controlled (dimmed) for each area 71 in accordance with images. Accordingly, images having more accurate contrast are displayed on display panel 70.

As illustrated in FIG. 9, end 150 of support member 100 on the front side (the side toward display panel 70, plus side in Z axis direction in FIG. 7) regulates approach of optical sheet 50 to light source 21 in excess of second predetermined clearance D2.

A positional relationship between reflection sheet 30 and flatter 40 is hereinafter described.

FIG. 10 is a cross-sectional view schematically illustrating an example of a structure in a vicinity of an end of video display device 1 according to the first exemplary embodiment.

As illustrated in FIG. 10, reflection sheet 30 extends to an outside of outer peripheral edge 42 of flatter 40 as viewed from the front side (plus side in Z axis direction). More specifically, reflection sheet 30 includes outer peripheral portion 37 at an end of reflection sheet 30 on the plus side in the X axis direction. Outer peripheral portion 37 corresponds to a portion which reflects light emitted from light sources 21. Outer peripheral portion 37 is formed on an outside of partitioning wall 31 (plus side in X axis direction). Outer peripheral portion 37 protrudes to the front side (plus side in Z axis direction), and to the outside (plus side in X axis direction) from partitioning wall 31 provided at an end on the plus side in the X axis direction (partitioning wall 31 illustrated in FIG. 10).

Outer peripheral portion 37 includes an inclined surface inclined to X-Y plane at a larger angle than a corresponding angle of inclined surface 31c of partitioning wall 31 (see FIG. 7). Note that outer peripheral portion 37 may be not required to be inclined, or may have a surface in parallel with the Z axis direction.

In addition, reflection sheet 30 may include flat portion 38 extending to the plus side in the X axis direction from an end of reflection sheet 30 on the side opposite to the partitioning wall 31 side of outer peripheral portion 37. Flat portion 38 is a portion not reflecting light emitted from light sources 21. Flat portion 38 is disposed between optical sheets 50 and second mold frame 62. Alternatively, flat portion 38 may be disposed between optical sheets 50 and base plate 10 (not shown) when first mold frame 61 and second mold frame 62 are formed integrally with each other. Accordingly, flat portion 38 of reflection sheet 30 is a portion supported by mold frame 60 (or base plate 10).

As described above, the light reflecting portion of reflection sheet 30 for reflecting light emitted from light sources 21 extends to the outside of outer peripheral edge 42 of flatter 40 as viewed from the front side (plus side in Z axis direction). According to the example illustrated in FIG. 10, a portion included in reflection sheet 30 and contacting optical sheet 50, and not corresponding to flat portion 38 resides at the end of video display device 1 on the plus side in the X axis direction, and extends to a position shifted to the plus side in the X axis direction from outer peripheral edge 42 of flatter 40 by clearance d1.

In addition, outer peripheral portion 37 of reflection sheet 30 is formed in a direction crossing the planar direction of flatter 40 (X-Y plane), and disposed on the extension line of flatter 40. Outer peripheral portion 37 of reflection sheet 30 is so disposed as to face flatter 40 in the planar direction of flatter 40 (X-Y plane).

Furthermore, outer peripheral portion 37 of reflection sheet 30 is disposed on the front side (plus side in Z axis direction) with respect to flatter 40. According to the example illustrated in FIG. 10, outer peripheral portion 37 of reflection sheet 30 is disposed at a position shifted from flatter 40 to the plus side in the Z axis direction by clearance d2.

In addition, outer peripheral edge 42 of flatter 40 is disposed inside the effective area of display panel 70 as viewed from the front side (plus side in Z axis direction). It is further preferable that outer peripheral portion 37 of reflection sheet 30 be disposed outside the effective area of display panel 70 as viewed from the front side. For example, it is more preferable that outer peripheral portion 37 be disposed outside the end of the effective area of display panel 70 by approximately 1.2 mm.

While the end of reflection sheet 30 on the plus side in the X axis direction has been described with reference to FIG. 10, each of an end of reflection sheet 30 on the minus side in the X axis direction, an end of reflection sheet 30 on the plus side in the Y axis direction, and an end on the minus side in the Y axis direction has a configuration substantially similar to the configuration of the end on the plus side in the X axis direction as illustrated in FIG. 10. The respective ends not shown in FIG. 10 are not repeatedly described.

[1-2. Effects and Others]

As described above, a video display device according to this exemplary embodiment includes: a display panel that displays an image based on an input image signal; a light source substrate that includes a plurality of light sources on a main surface which is a front side of the light source substrate, and emits, toward a rear side of the display panel, light emitted from the plurality of light sources; a reflection sheet that is provided on the main surface of the light source substrate, and in which hollow partitioning walls each of which separates adjacent two light sources of the plurality of light sources are formed; and an optical member that has a plate shape, is provided between the display panel and the light source substrate, and uniformizes luminance distribution of the light emitted from the light source substrate. The reflection sheet extends to an outside of an outer peripheral edge of the optical member as viewed from the front side.

Note that video display device 1 is an example of the video display device. Display panel 70 is an example of the display panel. Light sources 21 are an example of the light sources. Light source substrate 20 is an example of the light source substrate. Partitioning walls 31 are an example of the partitioning walls. Reflection sheet 30 is an example of the reflection sheet. Flatter 40 is an example of the optical member. Outer peripheral edge 42 is an example of the outer peripheral edge of the optical member.

For example, video display device 1 according to the example presented in the first exemplary embodiment includes: display panel 70 that displays an image based on an input image signal; light source substrate 20 that includes a plurality of light sources 21 on a main surface which is a front side of light source substrate 20, and emits, toward a rear side of display panel 70, light emitted from the plurality of light sources 21; reflection sheet 30 that is provided on the main surface of light source substrate 20, and in which hollow partitioning walls 31 each of which separates adjacent two light sources 21 of the plurality of light sources 21 are formed; and flatter 40 that is provided between display panel 70 and light source substrate 20, and uniformizes luminance distribution of the light emitted from light source substrate 20. Reflection sheet 30 extends to the outside of outer peripheral edge 42 of flatter 40 as viewed from the front side (plus side in Z axis direction).

An outer peripheral portion of the reflection sheet of the video display device may be formed in a direction crossing the optical member, and may be disposed on an extension line of the optical member.

The outer peripheral portion of the reflection sheet of the video display device may be disposed on front of the optical member.

The outer peripheral edge of the optical member of the video display device may be disposed inside an effective area of the display panel as viewed from the front side. The outer peripheral portion of the reflection sheet may be disposed outside the effective area of the display panel as viewed from the front side.

According to video display device 1 thus configured, reflection sheet 30 is disposed in such a position as to extend to the outside of outer peripheral edge 42 of flatter 40 as viewed from the front side (plus side in Z axis direction). In case of a video display device configured such that an area outside a flatter does not reflect light emitted from light sources, luminance lowering or luminance non-uniformity may be caused at an end of an effective area of a display panel. According to video display device 1, however, reflection sheet 30 even in the area outside flatter 40 can reflect light emitted from light sources 21. Accordingly, luminance lowering or luminance non-uniformity can decrease even at the end of the effective area of display panel 70. In other words, according to video display device 1 presented in this exemplary embodiment, reduction of luminance lowering or luminance non-uniformity at the end of the effective area of display panel 70 can be achieved with a relatively simplified configuration.

Outer peripheral portion 37 of reflection sheet 30 of video display device 1 is formed in a direction crossing flatter 40, and disposed on an extension line of flatter 40. According to this configuration of video display device 1, the end of flatter 40 and outer peripheral portion 37 of reflection sheet 30 can be disposed so as to face each other in a state that a clearance (clearance d1) is left between flatter 40 and reflection sheet 30. A part of light emitted from light sources 21 and passing through this clearance is reflected on outer peripheral portion 37 and travels toward display panel 70 or the center of the effective area of display panel 70. In other words, reflection sheet 30 is configured such that a part of light emitted from light sources 21 is reflected on an end side (end side of effective area of display panel 70) i.e., a portion easily lowering luminance, and travels toward display panel 70 or the center of the effective area of display panel 70. Accordingly, in case of video display device 1, reduction of luminance lowering or luminance non-uniformity can be effectively achieved even at the end of the effective area of display panel 70 with a relatively simplified configuration.

Outer peripheral portion 37 of reflection sheet 30 of video display device 1 is disposed on front of flatter 40. According to this configuration, a part of light emitted from light sources 21 can be reflected by reflection sheet 30 even on the front side of flatter 40 toward display panel 70 or the center of the effective area of display panel 70. Accordingly, in case of video display device 1, reduction of luminance lowering or luminance non-uniformity can be achieved even at the end of the effective area of display panel 70 with a relatively simplified configuration.

In addition, outer peripheral edge 42 of flatter 40 of video display device 1 is disposed inside the effective area of display panel 70 as viewed from the front side, while outer peripheral portion 37 of reflection sheet 30 is disposed outside the effective area of display panel 70 as viewed from the front side. According to this configuration, the clearance between flatter 40 and reflection sheet 30 (clearance d1) can be so provided as to cross the end of the effective area of display panel 70 in video display device 1. According to this configuration of video display device 1, a part of light emitted from light sources 21 can be reflected by reflection sheet 30 from the outside of the end of the effective area of display panel 70 toward the center of the effective area of display panel 70. Accordingly, in case of video display device 1, reduction of luminance lowering or luminance non-uniformity can be achieved even at the end of the effective area of display panel 70 with a relatively simplified configuration.

In addition, according to video display device 1, the clearance (clearance d1) between outer peripheral edge 42 of flatter 40 and reflection sheet 30 is provided throughout outer peripheral edge 42 of flatter 40. In this case, contact between flatter 40 and reflection sheet 30 can be prevented. Accordingly, generation of abnormal sound (noise) produced by contact between flatter 40 and reflection sheet 30 can be suppressed even when at least either flatter 40 or reflection sheet 30 vibrates with vibration of sound output from a speaker included in video display device 1, for example.

Other Exemplary Embodiments

The first exemplary embodiment has been described by way of example of the technology disclosed according to the present application. The accompanying drawings and detailed description have been presented for this purpose.

Accordingly, for presentation of examples of the technology, constituent elements shown in the accompanying drawings and detailed description may contain not only constituent elements essential for solving problems, but also constituent elements not essential for solving problems. It should not be therefore directly determined that the constituent elements which are not essential elements are essential based on the consideration that these constituent elements are included in the accompanying drawings and detailed description.

Moreover, the exemplary embodiments described above are presented as examples of the technology of the present disclosure, wherefore various modifications, replacements, additions, omissions and the like may be made within the scope of the claims and an equivalent range. In addition, a different exemplary embodiment may be produced by combining respective constituent elements described in the first exemplary embodiment.

Note that errors and variations in positions, shapes and the like of respective members included in the foregoing description are allowed as long as intended advantageous effects are offered. In addition, a phrase "uniformize luminance distribution" included in the above description and the appended claims does not only mean uniformization of distribution in a strict sense. Errors and variations may be allowed as long as intended advantageous effects are offered. Improvement of uniformity of luminance distribution is also implied by this phrase.

INDUSTRIAL APPLICABILITY

The present disclosure is applicable to a video display device. More specifically, the present disclosure is applicable to a television receiver, an image recording and reproducing device, a computer display device, and others.

REFERENCE MARKS IN THE DRAWINGS

1: video display device
1a: housing
10: base plate
11, 12: through hole
20: light source substrate
21: light source
22, 23: driver element
24: opening
25: screw hole
30: reflection sheet
31: partitioning wall
31a: intersection portion
31b: linear portion
31c: inclined surface
32, 33: opening
35: recess portion
36: adhesive tape
37: outer peripheral portion
40: flatter
41: hole
42: outer peripheral edge
50: optical sheet
60: mold frame
61: first mold frame
62: second mold frame
63, 64: cushion member
70: display panel
71: area
80: bezel
91: connection terminal substrate
92: signal processing substrate
93: power supply substrate
100: support member
105: shaft portion
110: wall portion
120: engaging portion
130: plate portion
140: support surface
150: end
d1: first predetermined clearance
d2: second predetermined clearance
d1, d2: clearance

The invention claimed is:

1. A video display device comprising:
a display panel that displays an image based on an input image signal;
a light source substrate that includes a plurality of light sources on a main surface which is a front side of the light source substrate, and emits, toward a rear side of the display panel, light emitted from the plurality of light sources;
a reflection sheet that has a front surface facing towards the display panel and a rear surface facing opposite to the display panel is provided on the main surface of the light source substrate, and in which hollow partitioning walls each of which separates adjacent two light sources of the plurality of light sources are formed; and
an optical member that has a plate shape, is provided between the display panel and the light source substrate, and uniformizes luminance distribution of the light emitted from the light source substrate,
wherein the reflection sheet includes a plurality of openings disposed at positions corresponding to each of the plurality of light sources,
wherein each of the plurality of light sources penetrates the reflection sheet and is exposed from the rear surface of the reflection sheet through one of the plurality of openings toward the front surface of the reflection sheet to directly illuminate the display panel,
wherein the reflection sheet extends to an outside of an outer peripheral edge of the optical member,
wherein an outer peripheral portion of the reflection sheet is formed in a direction obliquely crossing the optical member, and disposed on an extension line of the optical member and disposed on front of the optical member,
wherein there is a clearance between the outer peripheral edge of the optical member and the reflection sheet in a direction extending outwardly from the outer peripheral edge of the optical member, and
wherein the reflection sheet includes a flat surface portion extending from the outer peripheral portion of the reflection sheet and bent outwardly from the outer peripheral portion of the reflection sheet.

2. The video display device according to claim 1, wherein the outer peripheral edge of the optical member is disposed inside an effective area of the display panel as viewed from the front side, and
the outer peripheral portion of the reflection sheet is disposed outside the effective area as viewed from the front side.

3. The video display device according to claim 2, wherein the outer peripheral portion of the reflection sheet is disposed outside the effective area of the display panel by at least 1.2 mm.

4. The video display device according to claim 1, wherein the reflection sheet includes a first part parallel to the optical member, a second part starting from an end of the first part and obliquely crossing the first part in a direction extending outwardly from the outer peripheral edge of the optical member.

5. The video display device according to claim 1, wherein the outer peripheral edge of the optical member extends outside of a partitioning wall, wherein the partitioning wall is closest to an outer peripheral edge of the display panel.

6. The video display device according to claim 1, wherein the clearance between the outer peripheral edge of the optical member and the reflection sheet exists around the entire peripheral edge of the optical member.

7. The video display device according to claim 1, wherein the optical member does not contact any of the hollow partitioning walls of the reflection sheet.

8. The video display device according to claim 1, wherein light is emitted from the plurality of light sources penetrating the plurality of openings and exposed to the front surface of the reflection sheet, a part of the light is reflected on the reflection sheet toward the front side.

9. The video display device according to claim 1, wherein the reflection sheet has a flat portion around each of the plurality of openings, the flat portion being disposed on the light source substrate.

10. The video display device according to claim 9, wherein the reflection sheet is fixed at the flat portion to the light source substrate.

11. The video display device according to claim 10, wherein the flat portion is affixed to the light source substrate via an adhesive tape.

12. The video display device according to claim 1, wherein the video display device further comprising a base plate disposed on the rear side of the light source substrate, and to which the light source substrate is attached, and wherein the base plate is extended along the reflection sheet, and the flat surface portion of the reflection sheet is supported by the base plate.

13. The video display device according to claim 12, wherein the video display device further comprising an optical sheet disposed between the display panel and the optical member, and wherein a front surface of the flat surface portion is in contact with the optical sheet, and a rear surface of the flat surface portion is in contact with the base plate.

14. The video display device according to claim 1, wherein the video display device further comprising:

a base plate disposed on the rear side of the light source substrate, and to which the light source substrate is attached; and a mold frame attached to the base plate; and wherein the base plate is extended along the reflection sheet, and the flat surface portion is supported by the mold frame.

15. The video display device according to claim 14, wherein the video display device further comprising an optical sheet disposed between the display panel and the optical member, and wherein a front surface of the flat surface portion is in contact with the optical sheet, and a rear surface of the flat surface portion is in contact with the mold frame.

16. The video display device according to claim 4, wherein the outer peripheral portion of the reflection sheet extends from the second part, and includes an inclined surface inclined to the first part of the reflection sheet at a larger angle than the second part or a surface perpendicular to the first part.

17. The video display device according to claim 4, wherein the video display device further comprising a base plate disposed on the rear side of the light source substrate, and to which the light source substrate is attached, and wherein the base plate is extended along the first part and the second part of the reflection sheet, and wherein there is a clearance between the second part of the reflection sheet and the base plate.

* * * * *